US011778264B2

(12) United States Patent
Kim et al.

(10) Patent No.: US 11,778,264 B2
(45) Date of Patent: Oct. 3, 2023

(54) DEVICE AND METHOD FOR PROCESSING AND TRANSMITTING IMAGE DATA IN WIRELESS AV SYSTEM

(71) Applicant: LG ELECTRONICS INC., Seoul (KR)

(72) Inventors: Dongsung Kim, Seoul (KR); Hagryang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 17/595,295

(22) PCT Filed: Jul. 5, 2019

(86) PCT No.: PCT/KR2019/008253
§ 371 (c)(1),
(2) Date: Nov. 12, 2021

(87) PCT Pub. No.: WO2021/006358
PCT Pub. Date: Jan. 14, 2021

(65) Prior Publication Data
US 2022/0224972 A1  Jul. 14, 2022

(51) Int. Cl.
*H04N 21/4363* (2011.01)
*H04N 21/4402* (2011.01)

(52) U.S. Cl.
CPC ... *H04N 21/43637* (2013.01); *H04N 21/4402* (2013.01)

(58) Field of Classification Search
CPC ....... H04N 21/4402; H04N 21/440263; H04N 21/44029; H04N 21/8153; H04N 21/4363; H04N 21/43615
See application file for complete search history.

(56) References Cited

U.S. PATENT DOCUMENTS 9,635,212 B2 * 4/2017 Holtsberg .............. H04N 19/17
2003/0067555 A1 4/2003 Han
(Continued)

FOREIGN PATENT DOCUMENTS

EP  2315445  4/2011
EP  3136741  3/2017
(Continued)

OTHER PUBLICATIONS

PCT International Application No. PCT/KR2019/008253, International Search Report dated Apr. 2, 2020, 4 pages.
(Continued)

*Primary Examiner* — Alazar Tilahun
(74) *Attorney, Agent, or Firm* — LEE HONG DEGERMAN KANG & WAIMEY

(57) ABSTRACT

The present invention relates to a device and a method for processing and transmitting image data in a wireless AV system. The present specification provides a device comprising: an external device interface unit configured to receive an external input signal including an actual image (an actual picture); a control unit connected to the external device interface unit and configured to detect the external input signal and produce information on the external input signal; an image processing unit connected to the control unit, receiving, from the control unit, at least one among the external input signal and the information on the external input signal, determining an image compressibility on the basis of the information on the external input signal, and outputting a compressed image based on the determined image compressibility; and a communication unit for transmitting the compressed image through a wireless channel.

9 Claims, 8 Drawing Sheets

(56) References Cited

U.S. PATENT DOCUMENTS

2005/0286783 A1* 12/2005 Takada .................. H04N 19/59
382/232
2009/0196340 A1 8/2009 Tsukada
2012/0099641 A1* 4/2012 Bekiares .............. H04N 19/196
375/E7.076

FOREIGN PATENT DOCUMENTS

| KR | 101704775 | 2/2017 |
| KR | 1020170031324 | 3/2017 |
| WO | 2015-175232 | 11/2015 |

OTHER PUBLICATIONS

European Patent Office Application Serial No. 19936550.3, extended Search Report dated Mar. 6, 2023, 7 pages.

* cited by examiner

FIG. 3
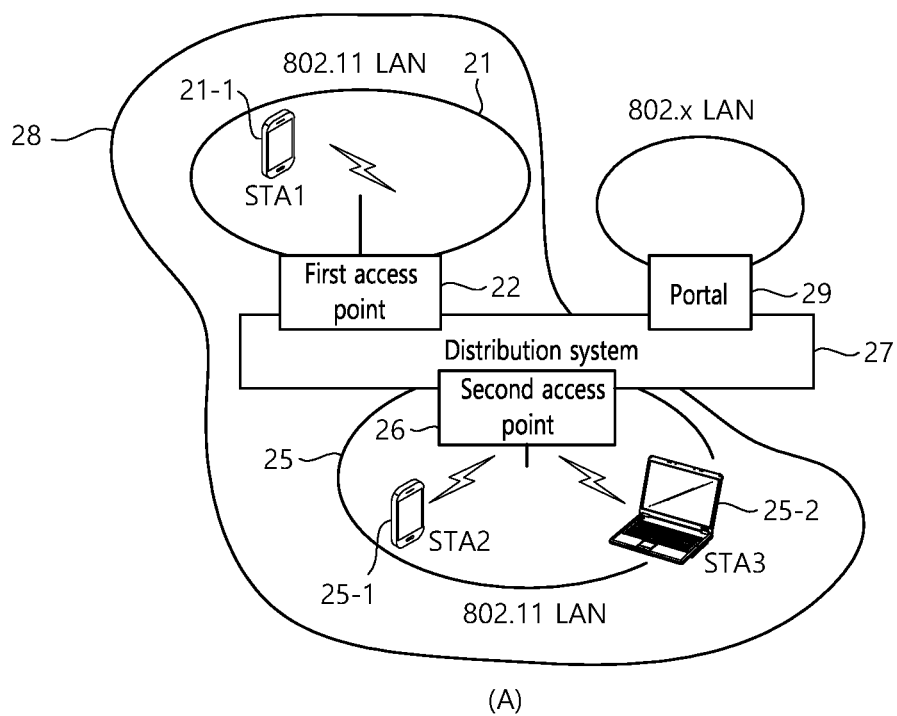
(A)
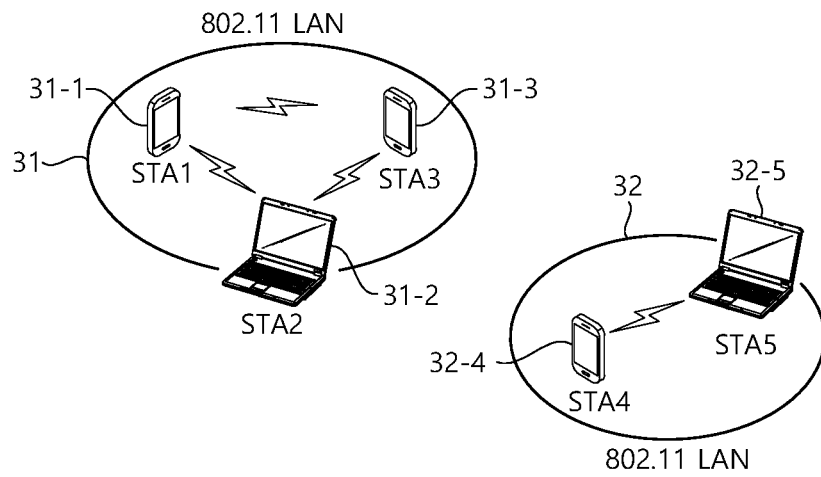
(B)

DEVICE AND METHOD FOR PROCESSING AND TRANSMITTING IMAGE DATA IN WIRELESS AV SYSTEM

CROSS-REFERENCE TO RELATED APPLICATIONS

This application is the National Stage filing under 35 U.S.C. 371 of International Application No. PCT/KR2019/008253, filed on Jul. 5, 2019, the contents of which are all incorporated by reference herein in their entirety.

BACKGROUND OF THE DISCLOSURE

Field of the Disclosure

The present disclosure relates to a wireless audio/video (AV) system and, most particularly, to a device and method for performing processing and transmission of video (or picture) data in a wireless AV system.

Related Art

Recently, there has been a growing demand for high-resolution and high-quality pictures, such as high definition (HD) pictures and ultra-high definition (UHD) pictures, in various fields. With the appearance of new applications, the demands for technology allowing data streams including audio, video (or pictures), or at least a combination thereof, to be wirelessly transmitted, have been increasing. An application field to which such technology can be applied is a wireless audio/video (AV) system.

In the wireless AV system, since video data having higher resolution and higher picture quality has relatively more increased information size or bit size being transmitted, as compared to the existing (or conventional) video data, extensive research for wirelessly transmitting high-capacity data at a high speed is being carried out. For example, a wireless AV system may transmit or receive high-capacity data based on wireless communication, such as Institute of Electrical and Electronics Engineers (IEEE) 802.11ad or IEEE 802.11ay, or any other similar ultra-high speed wireless communication.

As described above, since the wireless AV system is based on wireless communication, the wireless AV system includes issues related to RF signal performance, such as range expansion, interference cancellation, power saving. Therefore, the design for a wireless AV system that is advantageous for ensuring RF signal performance through range expansion, interference cancellation, power saving, is required.

SUMMARY OF THE DISCLOSURE

Technical Objects

A technical object of the present disclosure is to provide a device and method for performing processing and transmission of video (or picture) data in a wireless AV system.

Another technical object of the present disclosure is to provide a wireless data transmitting device and method that can perform adaptive and variable compression in accordance with a format and resolution of video data (or signal) that is inputted in a wireless AV system.

A further technical object of the present disclosure is to provide a wireless data transmitting device and method that can control (or adjust) a compression rate of input data in accordance with whether or not the input data of the wireless AV system is video data. Herein, in case the input data is not video data, the wireless data transmitting device and method may compress the input data at a compression rate that is higher than a pre-appended compression rate (i.e., visually lossless) and may then transmit the compressed input data. And, in case the input data is video data, the wireless data transmitting device and method may compress the input data at a compression rate that is lower than a pre-appended compression rate (i.e., visually lossless) and may then transmit the compressed input data.

Technical Solutions

According to an aspect of the present disclosure, provided herein is a device for processing and transmitting a picture in a wireless audio/video (AV) system. The device includes an external device interface unit being configured to receive an externally inputted signal including an actual picture, a controller being connected to the external device interface unit so as to detect the externally inputted signal and being configured to generate information related to the externally inputted signal, a picture processor being connected to the controller so as to receive at least one of the externally inputted signal and the information related to the externally inputted signal from the controller, determining a picture compression rate based on the information related to the externally inputted signal, and outputting the compressed picture based on the determined picture compression rate, and a communication unit transmitting the compressed picture through a wireless channel.

In one aspect, the information related to the externally inputted signal includes a presence or absence of the externally inputted signal.

In another aspect, when the controller detects the externally inputted signal, the controller may configure the information related to the externally inputted signal so as to indicate the presence of the externally inputted signal, the picture processor may determine the picture compression rate to be less than a threshold compression rate, and the compressed picture may be the actual picture that is compressed.

In yet another aspect, when the controller fails to detect the externally inputted signal, the controller may configure the information related to the externally inputted signal so as to indicate the absence of the externally inputted signal, the picture processor may determine the picture compression rate to be equal to or greater than a threshold compression rate, and the compressed picture may be a dummy picture that is compressed and not the actual picture.

In yet another aspect, the information related to the externally inputted signal may include a characteristic of the actual picture, and the picture processor may determine the picture compression rate based on the characteristic of the actual picture.

In yet another aspect, the characteristic of the actual picture may include a resolution of the actual picture, and, when the resolution of the actual picture is equal to or less than a reference resolution, the picture processor may configure the picture compression rate to 0, and, when the resolution of the actual picture exceeds the reference resolution, the picture processor may configure the picture compression rate to one of ½, ⅓ or ¼, and the compressed picture may be the actual picture that is compressed.

In yet another aspect, the information related to the externally inputted signal may include a presence or absence of the externally inputted signal and a characteristic of the actual picture.

In yet another aspect, when the controller fails to detect the externally inputted signal, the controller may configure the information related to the externally inputted signal so as to indicate the absence of the externally inputted signal, the picture processor may determine the picture compression rate to be equal to or greater than a threshold compression rate, and the compressed picture may be a dummy picture that is compressed and not the actual picture.

In yet another aspect, when the controller detects the externally inputted signal, the controller may configure the information related to the externally inputted signal so as to indicate the presence of the externally inputted signal, and the picture processor may determine the picture compression rate based on the characteristic of the actual picture.

In a further aspect, a characteristic of the actual picture may include a resolution of the actual picture, and, when the resolution of the actual picture is equal to or less than a reference resolution, the picture processor may configure the picture compression rate to 0, and, when the resolution of the actual picture exceeds the reference resolution, the picture processor may configure the picture compression rate to one of ½, ⅓ or ¼, and the compressed picture may be the actual picture that is compressed.

Effects of the Disclosure

According to the present disclosure, it will be possible to design a wireless AV system that is advantageous for ensuring RF signal performance through range expansion, interference cancellation, power saving.

BRIEF DESCRIPTION OF THE DRAWINGS

FIG. 3 is a conceptual diagram of a case where the wireless data transceiving system according to an embodiment of the present disclosure is implemented according to an IEEE 802.11 series communication protocol.

DESCRIPTION OF EXEMPLARY EMBODIMENTS

Figure 1:
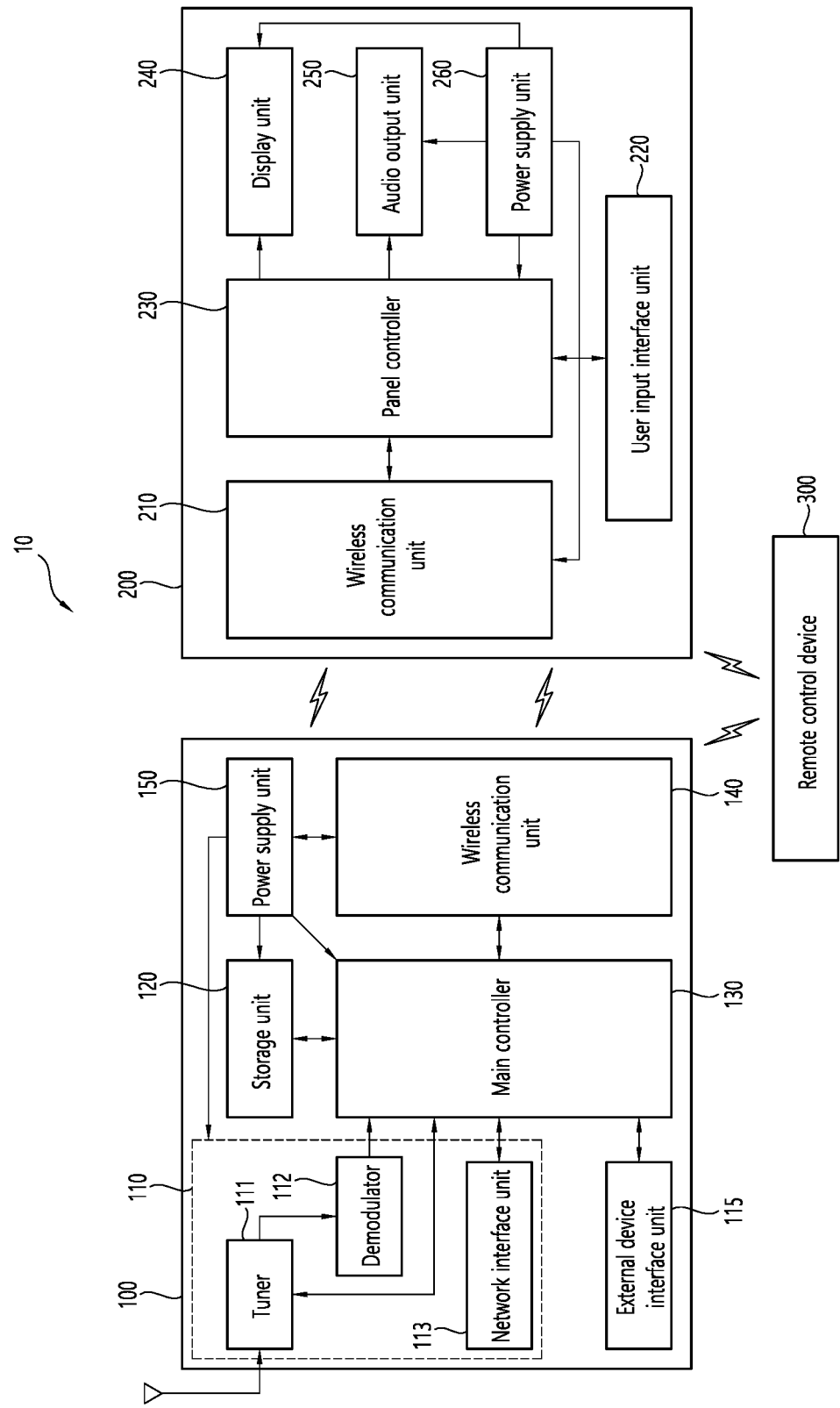
FIG. 1 is a block diagram of a wireless AV system according to an embodiment of the present disclosure.

The following detailed description illustrates embodiments of a device and method for transmitting wireless data and embodiments of a device and method for receiving wireless data that are provided according to the present disclosure. And, such embodiments do not represent the only forms of the present disclosure. The characteristics and features of the present disclosure are described with reference to exemplary embodiments presented herein. However, functions and structures that are similar or equivalent to those of the exemplary embodiments described in the present specification may be included in the scope and spirit of the present disclosure and may be achieved by other intended embodiments. Throughout the present specification, similar reference numerals will be used to refer to similar components or features. Hereinafter, embodiments of the present disclosure will be described in detail with reference to the accompanying drawings.

In recent years, the design of display devices, such as TVs, has become important, and display panels have become thinner with the development and evolution of technologies for display panels, such as OLED. However, due to the thickness of a driving circuit that is required in order to drive a display panel, there have been restrictions (or limitations) in manufacturing and designing thinner display panels. Therefore, a technology that is capable of separating components excluding components that are mandatorily required to be physically and electrically connected to the display panel, from the display panel, and equipping the physically or electrically separated components to a separate device (hereinafter referred to as a "main device") is being considered as a promising technology. In this case, a main device and a display device may be configured to exchange image signals and audio signals based on a wireless communication between the main device and the display device. The present disclosure relates to a wireless AV system, or a wireless display system being equipped with a main device and a display device that are provided as physically and/or electrically independent components, wherein media may be played (or reproduced) based on a wireless communication between the devices.

FIG. 1 is a block diagram of a wireless AV system according to an embodiment of the present disclosure.

Referring to FIG. 1, a wireless AV system 10 may include a main device 10, a display panel device 200, and a remote control device 300.

The main device 100 may perform an operation of receiving an external signal in a wired or wireless format that is related to audio, video, pictures, images, multimedia, or at least one combination thereof, processing the received external signal by using various methods, so as to generate a data stream or a bitstream, and transmitting the generated data stream or bitstream to the display device 200.

In order to perform such operation, the main device 100 may include an external signal receiver 110, an external device interface unit 115, a storage unit 120, a main controller 130, a wireless communication unit 140, and a power supply unit 150.

The external signal receiver 110 may include a tuner 111, a demodulator 112, and a network interface unit 113.

The tuner 111 receives an external signal in a wired or wireless format that is related to audio, video, pictures, images, multimedia, or at least one combination thereof. For example, the tuner 111 may select a specific broadcast channel in accordance with a channel selection command and may receive a broadcast signal corresponding to the selected specific broadcast channel.

The demodulator 112 may separate the received broadcast signal to a video signal, an image signal, a picture signal, an audio signal, and a data signal related to a broadcast program. And, then, the demodulator 112 may reconstruct (or restore or recover) the separated video signal, image signal, picture signal, audio signal, and data signal to a format that can be outputted.

The external device interface unit 115 may receive an application or an application list of a nearby (or neighboring) external device and may deliver (or communicate) the application or application list to the main controller 130 or storage unit 120.

The external device interface unit 115 may provide a connection path between the wireless AV system 100 and an external device. The external device interface unit 115 may receive an external input signal including audio, video, pictures, images, multimedia, or at least one combination thereof from an external device, which is connected to the main device 100 via wired or wireless connection, and may then deliver the received external input signal to the main controller 130. The external device interface unit 115 may include multiple external input terminals. The multiple external input terminals may include an RF terminal, an RGB terminal, one or more High Definition Multimedia Interface (HDMI) terminals, a USB terminal, a component terminal, an AV terminal, a CI terminal.

An external device that is connectable to the external device interface unit 115 may be any one of a set-top box, a Bluray player, a DVD player, a gaming system, a sound bar, a smart phone, a PC, a USB memory, a home theater system. However, these are merely exemplary.

The network interface unit 113 may provide an interface for connecting the main device 100 to a wired/wireless network including an internet network. The network interface unit 113 may transmit or receive data to or from another user or another electronic device through an accessed network or another network that is linked to the accessed network.

Additionally, some content data stored in the main device 100 may be transmitted to a user or an electronic device, which is selected from other users or other electronic devices that are pre-registered in the main device 100.

The network interface unit 113 may access a predetermined webpage through an accessed network or another network that is linked to the accessed network. That is, the network interface unit 113 may transmit or receive data to or from a corresponding server by accessing a predetermined webpage through the network.

Also, the network interface unit 113 may receive contents or data provided from a content provider or a network operator. That is, the network interface unit 113 may receive contents such as movies, advertisements, games, VODs, and broadcast signals, which are provided from a content provider or a network provider, and related information through the network.

Additionally, the network interface unit 113 may receive firmware update information and update files provided from a network operator and may transmit data to an internet or content provider or a network operator.

The network interface unit 113 may select and receive a wanted application among applications that are open to public, through the network.

The storage unit 120 may store programs for performing processing and control of each signal within the main controller 130, and then the storage unit 120 may store signal-processed image, voice, or data signals.

Additionally, the storage unit 120 may perform a function for temporarily storing image, voice, or data signals that are inputted from the external device interface unit 115 or network interface unit 113, and the storage unit 120 may also store information related to a predetermined image through a channel memory function.

The storage unit 120 may store an application or an application list that is inputted from the external device interface unit 115 or network interface unit 113.

The main controller 130 may control the main device 100 by using a user instruction (or command) that is inputted through the remote control device 300, or by using an internal program, and may access a network in order to be capable of downloading an application or an application list that is wanted by a user to the main device 100.

The main controller 130 enables user-selected channel information to be outputted along with a processed image or audio signal through a display device 200 or an audio output unit 250.

Additionally, the main controller 130 enables an image signal or audio signal, which is inputted from an external device, e.g., a camera or camcorder, through the external device interface unit 115, to be outputted through the display device 200 or audio output unit 250 in accordance with according to an external device image playback instruction (or command) that is received through the remote control device 300.

The main controller 130 may perform a control operation so that content stored in the storage unit 120, received broadcast content, or externally input content can be played back (or reproduced). Such content may be configured in various formats, such as a broadcast image, an externally inputted image, an audio file, a still image, an accessed (or connected) web screen, a document file, and so on.

The main controller 130 may decode a video, an image, a picture, a sound, or data related to a broadcast program being inputted through the demodulator 112, the external device interface unit 115, or the storage unit 120. Then, the main controller 130 may process the decoded data in accordance with encoding/decoding methods supported by the display device 200. Thereafter, the main controller 130 may process the encoded data by using various video/audio processing methods, such as compression and encoding, so as to transmit the corresponding data through a wireless channel, thereby generating a data stream or bitstream. Finally, the main controller 130 may transmit the generated data stream or bitstream to the display device 200 through the wireless communication unit 140.

Depending upon the embodiments, the main controller 130 may also bypass the decoded data, without encoding the decoded data in accordance with the encoding/decoding methods supported by the display device 200, and may directly transmit the decoded data to the display device 200 through the wireless communication unit 140.

The main controller 130 may be configured to implement the functions, procedures, and/or methods of a processor 1130 of a wireless data transmitting device 1100 that are to be described with reference to each embodiment of the present specification. Layers of the wireless interface protocol may be implemented in the processor 1130. The main controller 130 may be provided in the form of a system on chip (SoC).

The wireless communication unit 140 may be operatively coupled to the main controller 130, for example, as a combination of a wireless communication chip and an RF antenna. The wireless communication unit 140 may receive a data stream or bitstream from the main controller 130, may generate a wireless stream by encoding and/or modulating the data stream or bitstream into a format that can be transmitted through a wireless channel, and may transmit the generated wireless stream to the display device 200. The wireless communication unit 140 establishes a wireless link, and the main device 100 and the display device 200 are connected through the wireless link. The wireless communication unit 140 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication unit 140 may perform communication by using a communication protocol, such as a standard of the IEEE 802.11 series.

Depending upon the embodiments, the wireless communication unit 140 may include a picture processor performing picture processing (encoding, decoding, and so on) functions. In this case, the wireless communication unit 140 may perform an operation of encoding the picture, which is received from the main controller 130, in accordance with the picture format of the display device 200. Alternatively, the picture processor may be provided in the main controller 130 and not in the wireless communication unit 140. In this case, the main controller 130 may perform an operation of encoding the picture of the externally inputted signal in accordance with the picture format of the display device 200. Alternatively, the picture processor may be provided as an independent body each being connected to the wireless communication unit 140 and the main controller 130. In this case, the main controller 130 may transmit a picture signal, which is inputted through the external device interface unit 115, to the picture processor, the picture processor may encode the picture signal and transmit the encoded picture signal to the wireless communication unit 140, and the wireless communication unit 140 may wirelessly transmit the encoded picture signal to the display device 200.

The power supply unit 150 supplies power to the external signal receiver 110, the external device interface unit 115, the storage unit 120, the main controller 130, and the wireless communication unit 140. Methods for receiving power from an external source performed by the power supply unit 150 may include a terminal method and a wireless method. In case the power supply unit 150 receives power by using a wireless method, the power supply unit 150 may include a separate configuration in order to wirelessly receive power. For example, the power supply unit 150 may include a power pick-up unit configured to be magnetically coupled with an external wireless power transmitting device so as to receive wireless power, and a separate communication and control unit configured to perform communication with the wireless power transmitting device in order to receive wireless power and to control transmission and reception of wireless power.

The wireless communication unit 140 may also be wirelessly connected to the remote control device 300, thereby being capable of transferring (or delivering) signals inputted by the user to the main controller 130 or transmitter (or delivering) signals from the main controller 130 to the user. For example, the wireless communication unit 140 may receive or process control signals, such as power on/off, screen settings, and so on, of the main device 100 from the remote control device 300 or may process control signals received from the main controller 130 so that the processed signals can be transmitted to the remote control device 300 in accordance with various communication methods, such as Bluetooth, Ultra Wideband (WB), ZigBee, Radio Frequency (RF), or Infrared (IR) communication, and so on.

Additionally, the wireless communication unit 140 may deliver (or communicate) control signals that are inputted from a local key (not shown), such as a power key, a volume key, a setup key, and so on, to the main controller 130.

Subsequently, the display device 200 may process a wireless stream, which is received from the main device 100 through a wireless interface, by performing a reverse process of a signal processing operation that is performed by the main device 100, and, then, the display device 200 may output a display or audio (or sound). In order to perform such operation, the display device 200 may include a wireless communication unit 210, a user input interface unit 220, a panel controller 230, a display unit 240, an audio output unit 250, and a power supply unit 260.

The wireless communication unit 210 may be configured as a combination of a wireless communication chip and an RF antenna. The wireless communication unit 210 is connected to the wireless communication unit 140 of the main device 100 through a wireless link and performs wireless communication with the wireless communication unit 140 of the main device 100. More specifically, the wireless communication unit 210 receives a wireless stream from the wireless communication unit 140 of the main device 100, demodulates the received wireless stream, and transmits the demodulated wireless stream to the panel controller 230. The wireless communication unit 210 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication unit 210 may perform communication by using a communication protocol, such as a standard of the IEEE 802.11 series.

Depending upon the embodiments, the wireless communication unit 210 may include a picture processor performing picture processing (encoding, decoding, and so on) functions. In this case, the wireless communication unit 210 may perform an operation of decoding the picture, which is received from the main device 100. Alternatively, the picture processor may be provided in the panel controller 230 and not in the wireless communication unit 210. In this case, the panel controller 230 may perform an operation of decoding the picture, which is received from the wireless communication unit 210. Alternatively, the picture processor may be provided as an independent body each being connected to the wireless communication unit 210 and the panel controller 230. In this case, the wireless communication unit 210 may wirelessly receive a picture signal, which is then transmitted to the picture processor. And, the picture processor may decode the picture signal and then transmit the decoded picture signal to the panel controller 230.

The panel controller 230 decodes a signal that is demodulated by the wireless communication unit 210 so as to reconstruct (or recover) a bitstream or data stream. At this point, in case the bitstream or data stream is a compressed stream, the panel controller 230 may decompress or reconstruct the bitstream or data stream. Thereafter, the panel controller 230 may output the bitstream or data stream as a video signal, an image signal, a picture signal, an audio signal, or a data signal related to a broadcast program, and may transmit the signals to the display unit 240, the audio output unit 250, and the user input interface unit 220.

The video signal, the picture signal, the image signal, and so on, that are inputted to the display unit 240 may be displayed as a picture corresponding to the inputted picture signal. Alternatively, the picture signal that is processed by the panel controller 230 may be transmitted back to the main device 100 through the wireless communication unit 210 and may then be inputted to an external output device through the external device interface unit 115 of the main device 100.

The audio signal that is processed by the panel controller 230 may be audio-outputted to the audio output unit 250. Moreover, the audio signal that is processed by the panel controller 230 may be transmitted back to the main device 100 through the wireless communication unit 210 and may then be inputted to an external output device through the external device interface unit 115 of the main device 100.

Meanwhile, the panel controller 230 may control the display unit 240 so as to display a picture (or image). For example, the panel controller 230 may perform control operation, so that a broadcast picture (or image) that is inputted through the tuner 111, an externally inputted picture (or image) that is inputted through the external device interface unit 115, a picture (or image) that is inputted through the network interface unit, or a picture (or image) that is stored in the storage unit 120 can be displayed on the display unit 240. In this case, the picture (or image) that is displayed on the display unit 240 may be a still picture (or image) or a video, and may be a 2D image or a 3D image.

The panel controller 230 may be provided (or equipped) with a frame rate conversion (FRC) function. For example, based on the FRC function, the panel controller 230 may convert a reconstructed (or recovered) picture (or image) signal, which is reconstructed (or recovered) by the wireless communication unit 210 or panel controller 230 at a frame rate corresponding to an 8K display, and may then transfer the converted signal to a T-Con board.

The panel controller 230 may be configured to implement the functions, procedures, and/or methods of a processor 1230 included in a wireless data receiving device 1200, which will be described with reference to each embodiment of the present specification. Additionally, the processor 1230 may be configured to implement the functions, procedures, and/or methods of the wireless data receiving 1200 that will be described with reference to each embodiment of the present specification.

The user input interface unit 220 may transmit a signal that is inputted, by the user, to the panel controller 230 or may transmit a signal from the panel controller 230 to the user. For example, the user input interface unit 220 may receive and process control signals, such as power on/off, screen settings, and so on, of the display device 200 from the remote control device 300, or may process control signals received from the panel controller 230 so that the processed signals can be transmitted to the remote control device 300 in accordance with various communication methods, such as Bluetooth, Ultra Wideband (WB), ZigBee, Radio Frequency (RF), or Infrared (IR) communication, and so on.

The user input interface unit 220 may transmit a control signal, which is inputted through a local key (not shown), such as a power key, a volume key, a setup key, and so on, to the panel controller 230.

The power supply unit 260 supplies power to the wireless communication unit 210, the user input interface unit 220, the panel controller 230, the display unit 240, and the audio output unit 250. Methods for receiving power from an external source performed by the power supply unit 260 may include a terminal method and a wireless method. In case the power supply unit 260 receives power by using a wireless method, the power supply unit 260 may include a separate configuration in order to wirelessly receive power. For example, the power supply unit 260 may include a power pick-up unit configured to be magnetically coupled with an external wireless power transmitting device so as to receive wireless power, and a separate communication and control unit configured to perform communication with the wireless power transmitting device in order to receive wireless power and to control transmission and reception of wireless power.

The remote control device 300 performs an operation of remotely controlling various features of the main device 100 or the display device 200, such as power on/off, channel selection, screen setup, and so on. Herein, the remote control device 300 may also be referred to as a "remote controller (or remote)".

Meanwhile, since the main device 100 and the display device 200, which are shown in FIG. 1, are provided only as an example of one embodiment of the present disclosure, some of the illustrated components may be integrated or omitted, or other components may be added according to the specifications of the main device 100 and the display device 200, which are actually implemented. That is, as necessary, two or more components may be integrated into one component, or one component may be divided into two or more components. In addition, a function that is performed in each block is presented to describe an embodiment of the present disclosure, and a specific operation or device will not limit the scope and spirit of the present disclosure.

According to another embodiment of the present disclosure, unlike the example shown in FIG. 1, the main device 100 may receive and play-back (or reproduce) an image (or picture) through the network interface unit 113 or the external device interface unit 115 without including the tuner 111 and the demodulator 112.

For example, the main device 100 may be implemented by being divided into an image processing device, such as a set-top box, for receiving broadcast signals or content according to various network services, and a content playback device for playing content input from the image processing device.

In this case, an operating method of the wireless AV system 10 according to an embodiment of the present disclosure that will hereinafter be described may be performed not only by the main device 100 and the display device 200, as described above with reference to FIG. 1, but also by one of the divided image processing device, such as the set-top box, or content playback device, which includes an audio output unit 250.

In light of system input/output, the main device 100 may be referred to as a wireless source device that wirelessly provides a source, and the display device 200 may be referred to as a wireless sink device that wirelessly receives a source. The wireless source device and the wireless sink device may implement wireless display (WD) communication technologies that are compatible with standards such as wireless HD, wireless home digital interface (WHDI), WiGig, wireless USB, and Wi-Fi display (WFD, which also known as Miracast).

In light of the applications, the main device 100 may be integrated to a form that configures part of a wireless set-top box, a wireless gaming console, a wireless digital video disc (DVD) player, a wireless router, or the like. In this case, the main device 100 may be provided as a wireless communication module or a chip. The display device 200 may be integrated to a form that configures part of a user device or electronic device (e.g., a wireless TV, a wireless monitor, a wireless projector, a wireless printer, a wireless vehicle dashboard display, a wearable device, an augmented-reality (AR) headset, a virtual-reality (VR) headset, or the like) having a display panel so as to display an image and a video. In this case, the display device 200 may be provided in the form of a wireless communication module or chip.

The main device 100 and the display device 200 may be integrated to forms that configure parts of a mobile device.

For example, the main device 100 and the display device 200 may be integrated into a mobile terminal including a smartphone, a smartpad, a tablet PC, or other types of wireless communication devices, a portable computer having a wireless communication card, a personal digital assistant (PDA), a portable media player, a digital image capturing device, such as a camera or camcorder, or other flash memory devices having wireless communication capabilities. In this case, the main device 100 and the display device 200 may be provided in the form of wireless communication modules or chips.

Smartphone users may perform streaming or mirroring of a video and an audio, which are outputted by the users' smartphones, tablet PCs, or other computing devices, to another device, such as a television or a projector, in order to provide a higher resolution display or other enhanced user experience.

As described above, the main device 100 may receive an external signal in a wired or wireless format that is related to a medium, such as audio, video, a picture, an image, multimedia, or at least one combination thereof, and the main device 100 may process the received external signal by using various methods, so as to generate a data stream or bitstream, and may transmit the data stream or bitstream to the display device 200 through a wireless interface.

Hereinafter, image (or picture)/video/audio data that are transmitted through a wireless interface will be collectively referred to as wireless data. That is, the main device 100 may wirelessly communicate with the display device 200 and may transmit wireless data. Therefore, in light of a wireless data transceiving system 1000, the main device 100 may be referred to as a wireless data transmitting device 1100, and the display device 200 may be referred to as a wireless data receiving device 1200. Hereinafter, the present disclosure will be described in more detail in light of the wireless data transceiving system 1000. Firstly, a detailed block diagram of the wireless data transceiving system 1000 will be illustrated.

Figure 2:
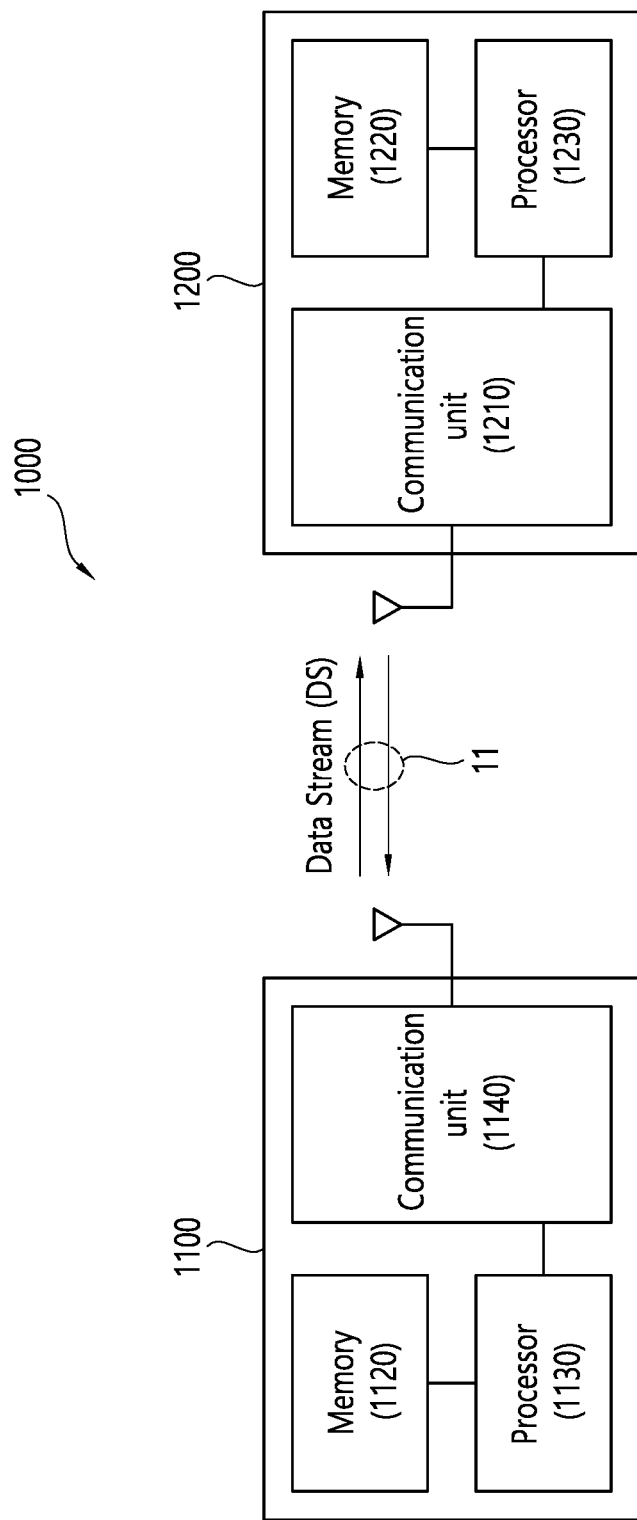
FIG. 2 is a block diagram showing a wireless data transceiving system according to an embodiment of the present disclosure.

FIG. 2 is a block diagram showing a wireless data transceiving system according to an embodiment of the present disclosure.

Referring to FIG. 2, a wireless data transceiving system 1000 refers to a system that wirelessly transmits and receives a data stream. And, the wireless data transceiving system 1000 includes a wireless data transmitting 1100 and at least one wireless data receiving device 1200. The wireless data transmitting device 1100 is communicatively coupled to the at least one wireless data receiving device 1200.

According to an aspect, the data may be configured of an audio, a video, a picture, an image, multimedia, or at least one combination thereof.

According to another aspect, the data may include a bitstream in the form of a compressed audio, a bitstream in the form of a compressed video, a bitstream in the form of a compressed picture, a bitstream in the form of compressed multimedia, or at least one combination thereof. In this case, the wireless data transceiving system 1000 may also be referred to as a wireless compressed data stream transceiving system. Additionally, the wireless compressed data stream transceiving system 1000 may further include a functional or physical unit for compressing data.

Referring to the detailed configuration of each device, the wireless data transmitting device 1100 includes a processor 1130, a memory 1120, and a communication unit 1140, and the wireless data receiving device 1200 includes a communication unit 1210, a memory 1220, and a processor 1230.

The processor 1130 may be configured to implement the functions, procedures, and/or methods of the wireless data transmitting device 1100 that are to be described with reference to each embodiment of the present specification. Also, the processor 1230 may also be configured to implement the functions, procedures, and/or methods of the wireless data receiving device 1200 that are to be described with reference to each embodiment of the present specification. Layers of the wireless interface protocol may be implemented in the processors 1130 and 1230.

In light of the display system in FIG. 1, the processor 1130 may be configured to perform the function of the main controller 130. For example, the processor 1130 may decode a video, an image, a picture, a sound, or data related to a broadcast program that are inputted through the demodulator 112, the external device interface unit 115, or the storage unit 120, may process the decoded data by using various video/audio processing methods, such as compression and encoding, so as to transmit the data through a wireless channel, thereby generating a data stream or bitstream, and may transmit the generated data stream or bitstream to the display device 200 through the communication unit 1140.

The memories 1120 and 1220 are operatively coupled with the processors 1130 and 1230 and store various types of information for operating the processors 1130 and 1230.

The communication units 1140 and 1210 are operatively coupled with the processors 1130 and 1230 and wirelessly transmit and/or receive data. The communication units 1140 and 1210 establish a wireless link 11, and the wireless data transmitting device 1100 and the wireless data receiving device 1200 are inter-connected through the wireless link 11. The communication units 1140 and 1210 may be configured based on various wireless communication modes, such as short-range wireless communication including Wi-Fi, Bluetooth, NFC, and RFID, or a mobile communication network (e.g., 3G, 4G, and 5G cellular networks). For example, the wireless communication units 1140 and 1210 may perform communication by using a communication protocol, such as a standard of the IEEE 802.11 series.

FIG. 3 is a conceptual diagram of a case where the wireless data transceiving system according to an embodiment of the present disclosure is implemented according to an IEEE 802.11 series communication protocol.

Referring to FIG. 3, a wireless data transceiving system 20 in (A) of FIG. 3 may include at least one basic service set (hereinafter referred to as 'BSS') 21 and 25. A BSS is a set consisting of an access point (hereinafter referred to as 'AP') and a station (STA) that are successfully synchronized and, thus, capable of communicating with each other. Herein, the BSS does not refer to a specific region (or area).

For example, a first BSS 21 may include a first AP 22 and one first STA 21-1. A second BSS 25 may include a second AP 26 and one or more STAs 25-1 and 25-2. Herein, the first AP 22 may correspond to the communication unit 1140 of FIG. 2, and the one or more STAs 25-1 and 25-2 may correspond to the communication unit 1210 of FIG. 2.

An infrastructure BSS 21 and 25 may include at least one STA, APs 22 and 26 providing a distribution service, and a distribution system (DS) 27 connecting multiple APs.

The distribution system 27 may implement an extended service set (hereinafter referred to as 'ESS') 28, which is extended by being connected to multiple BSSs 21 and 25. The ESS 28 may be used as a term indicating one network that is configured by connecting one or more APs 22 and 26 through the distribution system 27. At least one AP being included in one ESS 28 may have a same service set identification (hereinafter referred to as 'SSID').

A portal 29 may perform the role of a bridge, which connects the wireless LAN network (IEEE 802.11) with another network (e.g., 802.X).

In a WLAN having the structure shown in (A) of FIG. 3, a network between the APs 22 and 26 and a network between the APs 22 and 26 and the STAs 21-1, 25-1, and 25-2 may be implemented.

Meanwhile, unlike the system shown in (A) of FIG. 3, the wireless data transceiving system 30 shown in (B) of FIG. 3 may be capable of performing communication by establishing a network between the STAs without any APs 22 and 26. A network that is capable of performing communication by establishing a network between the STAs without any APs 22 and 26 is defined as an Ad-Hoc network or an independent basic service set (hereinafter referred to as 'IBSS').

Referring to (B) of FIG. 3, the wireless data transceiving system 30 is a BSS that operates in the Ad-Hoc mode, i.e., an IBSS. Since the IBSS does not include any AP, a centralized management entity that performs a management function at the center does not exist. Therefore, in the wireless data transceiving system 30, STAs 31-1, 31-2, 31-3, 32-4, and 32-5 are managed in a distributed manner. Here, the STAs 31-1, 31-2, 31-3, 32-4, and 32-5 may correspond to the communication unit 1140 or the communication unit 1210 of FIG. 2.

All STAs 31-1, 31-2, 31-3, 32-4, and 32-5 included in the IBSS may be configured as mobile STAs and are not allowed to access a distributed system. All of the STAs included in the IBSS establish a self-contained network.

An STA that is mentioned in the present specification is a random functional medium including a medium access control (hereinafter referred to as 'MAC') and a physical layer interface for a wireless medium according to the regulations of the Institute of Electrical and Electronics Engineers (IEEE) 802.11 standard and may be used to broadly refer to both an AP and a non-AP STA.

An STA that is mentioned in the present specification may be referred to by using various terms, such a mobile terminal, a wireless device, a wireless transmit/receive unit (WTRU), a user equipment (UE), a mobile station (MS), a mobile subscriber unit, and, simply, a user.

Referring back to FIG. 2, a communication channel that is established by the communication units 1140 and 1210 may be a network communication channel. In this case, the communication units 1140 and 1210 may establish a tunneled direct link setup (TDLS) in order to avoid or reduce network congestion. Wi-Fi Direct and TDLS are used for setting up relatively short-range communication sessions. The communication channel that establishes a wireless link 11 may be a communication channel of a relatively short range or a communication channel that is implemented by using a physical channel structure, such as Wi-Fi using a variety of frequencies including 2.4 GHz, 3.6 GHz, 5 GHz, 60 GHz, or ultra-wideband (UWB), Bluetooth, and so on.

While techniques disclosed in the present specification may generally be described in relation with communication protocols, such as the IEEE 802.11 series standard, it will be apparent that aspects of such techniques may also be compatible with other communication protocols. Illustratively and non-restrictively, wireless communication between the communication units 1140 and 1210 may use orthogonal frequency-division multiplexing (OFDM) schemes. Other various wireless communication schemes including, but not limited to, time-division multiple access (TDMA), frequency-division multiple access (FDMA), code-division multiple access (CDMA), or any random combination of OFDM, FDMA, TDMA, and/or CDMA may also be used.

The processors 1130 and 1230 may include an application-specific integrated circuit (ASIC), a different chipset, a logic circuit, and/or a data processor. The memories 1120 and 1220 may include a read-only memory (ROM), a random access memory (RAM), a flash memory, a memory card, a storage medium, and/or another storage device. The communication units 1140 and 1210 may include a baseband circuit for processing radio frequency signals. When an embodiment is implemented as software, the techniques described herein may be implemented as a module (e.g., a procedure, function, and so on) that performs the functions described in the present specification. The module may be stored in the memories 1120 and 1220 and may be executed by the processors 1130 and 1230. The memories 1120 and 1220 may be implemented inside the processors 1130 and 1230. Alternatively, the memories 1120 and 1220 may be implemented outside of the processors 1130 and 1230, and the memories 1120 and 1220 may be communicatively connected to the processors 1130 and 1230 via various well-known means that are disclosed in this technical field.

In light of a wireless communication system (i.e., WLAN, Wi-Fi), the wireless data transmitting device 1100 may be referred to as an AP or a personal basic service set control point (PCP) station, and the wireless data receiving device 1200 may be referred to as an STA or a non-personal basic service set control point (non-PCP) station.

In light of the input/output of a data stream, the wireless data transmitting device 1100 may be referred to as a wireless source device that wirelessly provides a source, and the wireless data receiving device 1200 may be referred to as a wireless sink device that wirelessly receives a source. The wireless source device and the wireless sink device may implement wireless display (WD) communication technologies that are compatible with standards such as wireless HD, wireless home digital interface (WHDI), WiGig, wireless USB, and Wi-Fi display (WFD, which also known as Miracast).

In light of the applications, the wireless data transmitting device 1100 may be integrated to a form that configures part of a wireless set-top box, a wireless gaming console, a wireless digital video disc (DVD) player, a wireless router, or the like. In this case, the wireless data transmitting device 1100 may be provided as a wireless communication module or a chip. And, the wireless data receiving device 1200 may be integrated to a form that configures part of a user device or electronic device (e.g., a wireless TV, a wireless monitor, a wireless projector, a wireless printer, a wireless vehicle dashboard display, a wearable device, an augmented-reality (AR) headset, a virtual-reality (VR) headset, or the like) having a display panel so as to display an image and a video. In this case, the wireless data receiving device 1200 may be provided in the form of a wireless communication module or chip.

The wireless data transmitting device 1100 and the wireless data receiving device 1200 may be integrated to forms that configure parts of a mobile device. For example, the wireless data transmitting device 1100 and the wireless data receiving device 1200 may be integrated into a mobile terminal including a smartphone, a smartpad, a tablet PC, or other types of wireless communication devices, a portable computer having a wireless communication card, a personal digital assistant (PDA), a portable media player, a digital image capturing device, such as a camera or camcorder, or other flash memory devices having wireless communication capabilities. In this case, the wireless data transmitting device 1100 and the wireless data receiving device 1200 may be provided in the form of wireless communication modules or chips.

Smartphone users may perform streaming or mirroring of a video and an audio, which are outputted by the users' smartphones, tablet PCs, or other computing devices, to another device, such as a television or a projector, in order to provide a higher resolution display or other enhanced user experience.

Figure 4:
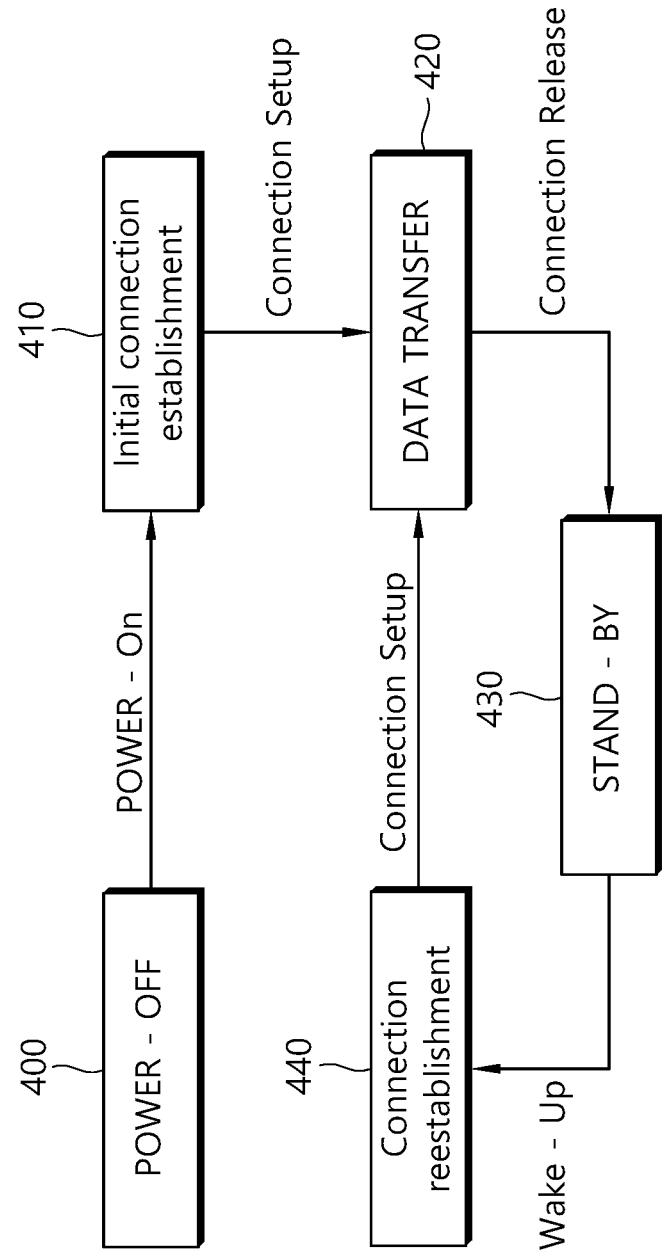
FIG. 4 shows a machine state of a wireless AV system according to an embodiment of the present disclosure.

FIG. 4 shows a machine state of a wireless AV system according to an embodiment of the present disclosure.

Referring to FIG. 4, a wireless AV system may enter or operate in a power off mode 400, an initial connection establishment mode 410, a data transfer mode 420, a stand-by mode 430, and a connection re-establishment mode 440. The initial connection establishment mode may also be referred to as an initial wakeup mode, and the connection re-establishment mode may also be simply referred to as a connection establishment mode.

The operation mode of the wireless AV system may be changed or transitioned (or shifted) in accordance with a direction of the arrows. For example, the wireless AV system may operate in the power off mode 400. Thereafter, when power is applied to the wireless AV system, the wireless AV system may enter or shift to the initial connection establishment mode 410. Additionally, the wireless AV system may operate in the initial connection establishment mode 410, and, when connection setup is completed, the wireless AV system may enter or shift to the data transfer mode 420. Additionally, the wireless AV system may operate in the data transfer mode 420, and, when the wireless AV system is deactivated, connection is cancelled (or the wireless AV system is disconnected), and the wireless AV system may enter or shift to the stand-by mode 430. Additionally, the wireless AV system may operate in the stand-by mode 430, and, when the wireless AV system is activated, the wireless AV system wakes up and may, then, enter or shift to the connection re-establishment mode 440. Furthermore, the wireless AV system may operate in the connection re-establishment mode 440, and, when connection setup is completed, the wireless AV system may, once again, enter or shift to the data transfer mode 420.

Since the wireless AV system may be configured of a wireless data transmitting device and a wireless data receiving device, a state machine according to FIG. 4 may be identically applied to each device. That is, each of the wireless data transmitting device and the wireless data receiving device may enter or operate in a power off mode 400, an initial connection establishment mode 410, a data transfer mode 420, a stand-by mode 430, and a connection re-establishment mode 440. Furthermore, the mode shift or entering of the wireless data transmitting device and the wireless data receiving device may also be carried out according to the same method as the above-described mode shift or entering of the wireless AV system.

The operation of the wireless data transmitting device for each mode may be performed by the main controller 130 of FIG. 1 or the processor 1130 of FIG. 2, and by the wireless communication unit 140 of FIG. 1 or the communication unit 1140 of FIG. 2.

Additionally, the operation of the wireless data receiving device for each mode may be performed by the panel controller 230 of FIG. 1 or the processor 1230 of FIG. 2, and by the wireless communication unit 210 of FIG. 1 or the communication unit 1210 of FIG. 2.

In the present specification, activation of the wireless data transmitting device may include operations or functions or meanings according to various embodiments. As an example, the activation of the wireless data transmitting device may include an operation of turning on a picture-related data transmission function (turn on operation). As another example, the activation of the wireless data transmitting device may include an operation of receiving a power on signal from a remote controller and turning on the power of the wireless data transmitting device (power on operation).

In the present specification, deactivation of the wireless data transmitting device may include operations or functions or meanings according to various embodiments. As an example, the deactivation of the wireless data transmitting device may include an operation of turning off a picture-related data transmission function (turn off operation). As another example, the deactivation of the wireless data transmitting device may include an operation of receiving a power off signal from a remote controller and turning on the power of the wireless data transmitting device (power off operation). In any case, even if the wireless data transmitting device is deactivated, the communication unit of the wireless data transmitting device is normally operated. And, therefore, basic communication between the wireless data transmitting device and the wireless data receiving device may continue to be maintained.

The activation or deactivation of the wireless data transmitting device may be detected and managed by the main controller 130 of FIG. 1 or the processor 1130 of FIG. 2.

In the present specification, activation of the wireless data receiving device may include operations or functions or meanings according to various embodiments. As an example, the activation of the wireless data receiving device may include an operation of turning on a picture-related data reception function (turn on operation). As another example, the activation of the wireless data receiving device may include an operation of receiving a power on signal from a remote controller and turning on the power of the wireless data receiving device (power on operation). As yet another example, the activation of the wireless data receiving device may include an operation of turning on the power of a display unit (power on operation).

In the present specification, deactivation of the wireless data receiving device may include operations or functions or meanings according to various embodiments. As an example, the deactivation of the wireless data receiving device may include an operation of turning off a picture-related data reception function (turn off operation). As another example, the deactivation of the wireless data receiving device may include an operation of receiving a power off signal from a remote controller and turning off the power of the wireless data receiving device (power off operation). As yet another example, the deactivation of the wireless data receiving device may include an operation of turning off the power of a display unit (power off operation). In any case, even if the wireless data receiving device is deactivated, the communication unit of the wireless data receiving device is normally operated. And, therefore, basic communication between the wireless data transmitting device and the wireless data receiving device may continue to be maintained.

The activation or deactivation of the wireless data receiving device may be detected and managed by the panel controller 230 of FIG. 1 or the processor 1230 of FIG. 2.

Hereinafter, a device for processing and transmitting pictures (or images) in a wireless AV device will be disclosed.

Figure 5:
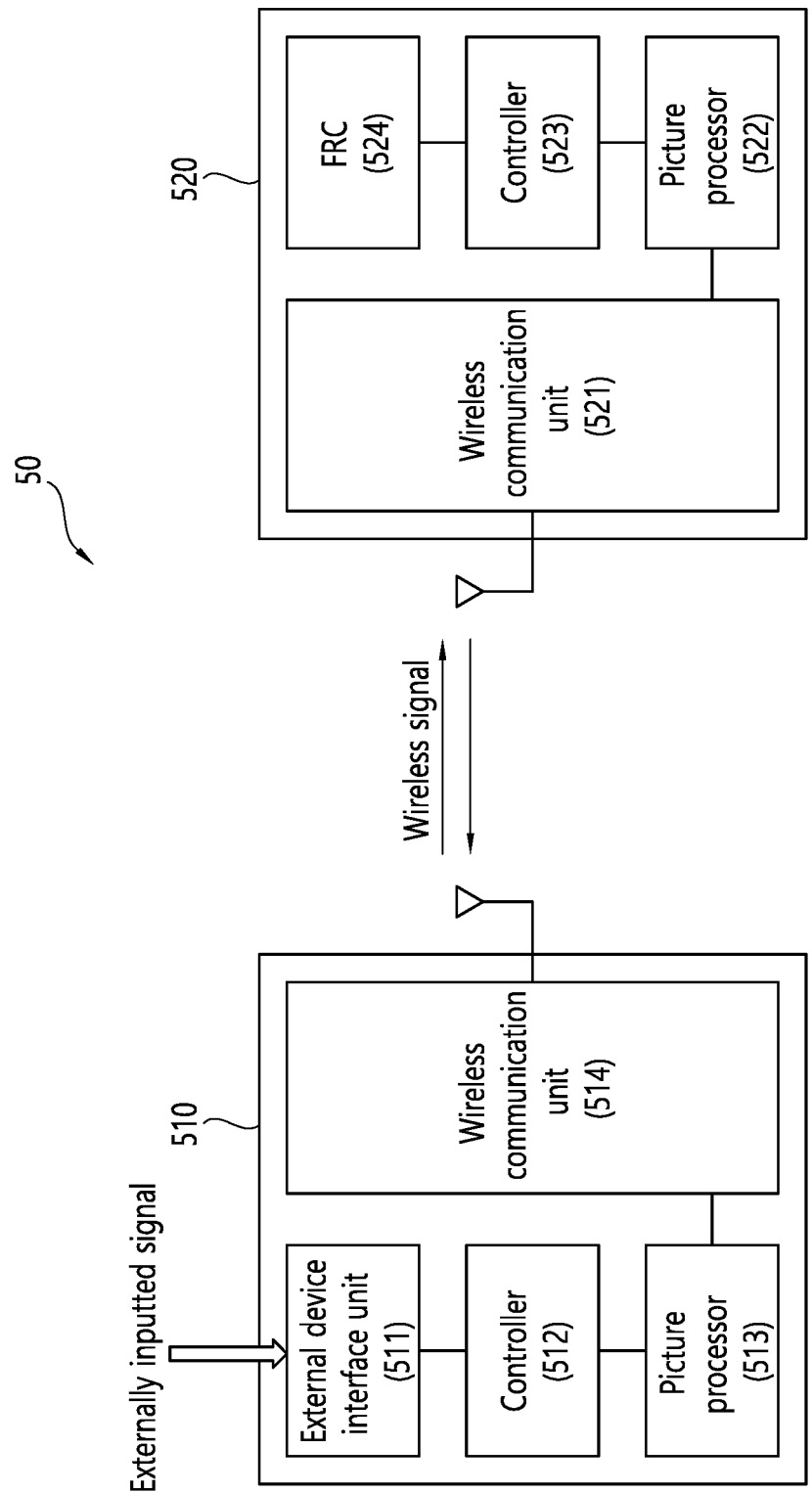
FIG. 5 shows a device processing and transmitting pictures (or images) in a wireless AV system according to an embodiment of the present disclosure.

FIG. 5 shows a device processing and transmitting pictures (or images) in a wireless AV system according to an embodiment of the present disclosure.

Referring to FIG. 5, a wireless AV system 50 includes a picture transmitting device 510 and a picture receiving device 520. The picture transmitting device 510 according to the present embodiment may be the main device 100 of FIG. 1, and the picture receiving device 520 may be the display device 200 of FIG. 1.

The picture transmitting device 510 includes an external device interface unit 511, a controller 512, a picture processor 513 performing picture encoding or decoding function(s), and a wireless communication unit 514. The picture processor 513 may be provided as a functional element of the controller 512, or may be provided as a functional element of the wireless communication unit 514. The wireless communication unit 514 may perform the same function as the wireless communication unit 140 of FIG. 1.

The external device interface unit 511 may perform the same function as the external device interface unit 115 of FIG. 1. For example, the external device interface unit 511 may include multiple external input terminals, and the multiple external input terminals may include an RF terminal, an RGB terminal, one or more High Definition Multimedia Interface (HDMI) terminals, a USB terminal, a component terminal, an AV terminal, a CI terminal.

The external device interface unit 511 may receive an externally inputted signal from an external device, and the externally inputted signal may, for example, include an actual picture. That is, an actual picture is a picture that is included in the externally inputted signal, which is inputted through the external device interface unit 511. Here, an actual picture may also be referred to as an original picture. Meanwhile, a dummy picture is a concept that is in contrast with the actual picture. A dummy picture is a picture that is not an actual picture. When an externally inputted signal that is inputted through the external device interface unit 511 does not exist, a dummy picture may be defined as a random picture being transmitted to the picture receiving device 520. In this meaning, the dummy picture may also be referred to as a substitute picture or a stand-by picture.

That is, a picture signal includes an actual picture and a dummy picture. And, in the present embodiment, depending upon the presence or absence of an externally inputted signal, an actual picture or dummy picture may be transmitted to the picture receiving device 520.

The controller 512 may perform the same function as the main controller 130 of FIG. 1. Also, the controller 512 determines the source (or input mode) of the externally inputted signal being inputted to the external device interface unit 511. For example, the controller 512 may determine which one of an RF terminal, an RGB terminal, one or more HDMI terminals, a USB terminal, a component terminal, an AV terminal, a CI terminal is the source (or input mode) of the externally inputted signal being inputted to the external device interface unit 511.

Additionally, the controller 512 is connected to the external device interface unit 511 so as to monitor an externally inputted signal, generates information related to an externally inputted signal, and delivers the generated information related to an externally inputted signal to the picture processor 513.

For example, the information related to an externally inputted signal may include the presence or absence of an externally inputted signal. In this case, operations of the controller 512 and the picture processor 513 may be performed based on the flowchart of FIG. 6.

Figure 6:
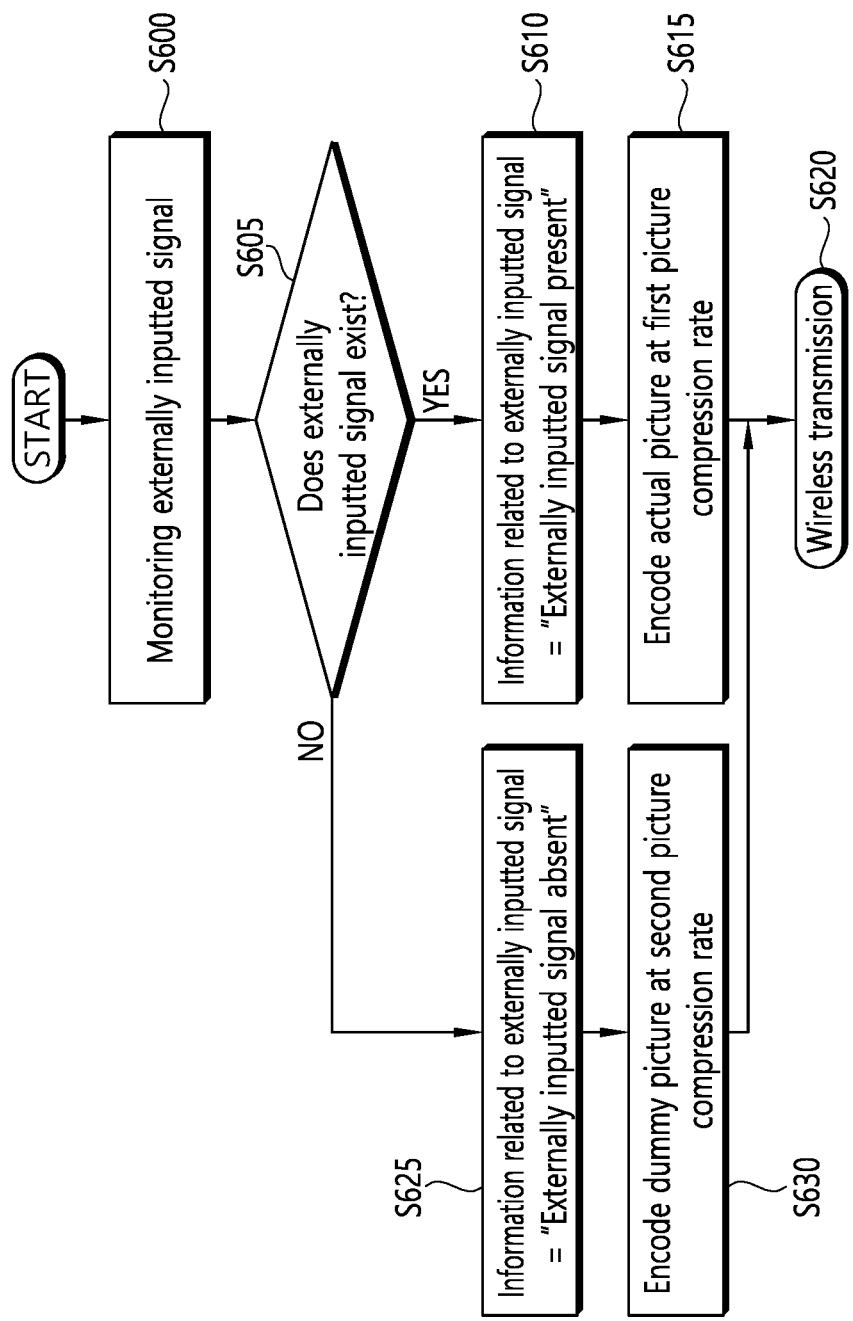
FIG. 6 is a flowchart showing operations of a video transmitting device according to an example.

FIG. 6 is a flowchart showing operations of a video transmitting device according to an example.

Referring to FIG. 6, a controller 512 monitors an externally inputted signal that is inputted from an external device interface unit 511 (S600). For example, the controller 512 monitors physical contact between the external device interface unit 511 and an external input source and/or an intensity of the externally inputted signal, and, based on the monitoring result, the controller 512 may determine the presence or absence of an externally inputted signal. Therefore, the controller 512 determines whether an externally inputted signal exists (S605).

If the controller 512 detects an externally inputted signal that is inputted from the external device interface unit 511, the controller 512 indicates information related to the externally inputted signal as "externally inputted signal present" and delivers the information related to the externally inputted signal to the picture processor 513 (S610). The picture processor 513 determines a first picture compression rate based on the information related to the externally inputted signal and encodes an actual picture by using the first picture compression rate (S615). Thereafter, the wireless communication unit 514 wirelessly transmits the actual picture that is encoded at the first picture compression rate. The first picture compression rate may, for example, be no compression, i.e., 0. Alternatively, the first picture compression rate may be a visually lossless compression rate, or a compression rate that is lower than a visually lossless compression rate. A visually lossless compression rate may also be referred to as a threshold compression rate.

Meanwhile, in step S605, if the controller 512 fails to detect any externally inputted signal that is inputted from the external device interface unit 511, the controller 512 indicates the presence or absence of the externally inputted signal as "externally inputted signal absent" and delivers the information related to the externally inputted signal to the picture processor 513 (S625). The picture processor 513 determines a second picture compression rate based on the information related to the externally inputted signal and encodes a dummy picture by using the second picture compression rate (S630). Thereafter, the wireless communication unit 514 wirelessly transmits the dummy picture that is encoded at the second picture compression rate. The second picture compression rate may be relatively higher than the first picture compression rate. For example, the second picture compression rate may have a compression ratio that is equal to or greater than a multiple of ⅙ to ¹/₁₀. Alternatively, the second picture compression rate may be a compression rate that is higher than a visually lossless compression rate. A visually lossless compression rate may also be referred to as a threshold compression rate.

As described above, when the wireless AV system determines the presence or absence of an externally inputted signal, and, in case an externally inputted signal does not exist (i.e., in case an externally inputted signal is absent), the wireless AV system performs picture compression at a visually lossless compression rate or higher and transmits the compressed picture, thereby securing RF signal performance. And, in case it is determined that an externally inputted signal is present, a picture is compressed at a visually lossless compression rate and transmitted, thereby ensuring quality of a picture signal.

Referring back to FIG. 5, the information related to an externally inputted signal will be described in detail.

As another example, information related to an externally inputted signal may include a characteristic of an actual picture that is included in the externally inputted signal.

And, the picture processor 513 may determine a picture compression rate based on the characteristic of the actual picture. The characteristic of the actual picture may be, for example, a resolution or a format. In this case, operations of the controller 512 and the picture processor 513 may be performed based on the flowchart of FIG. 7.

Figure 7:
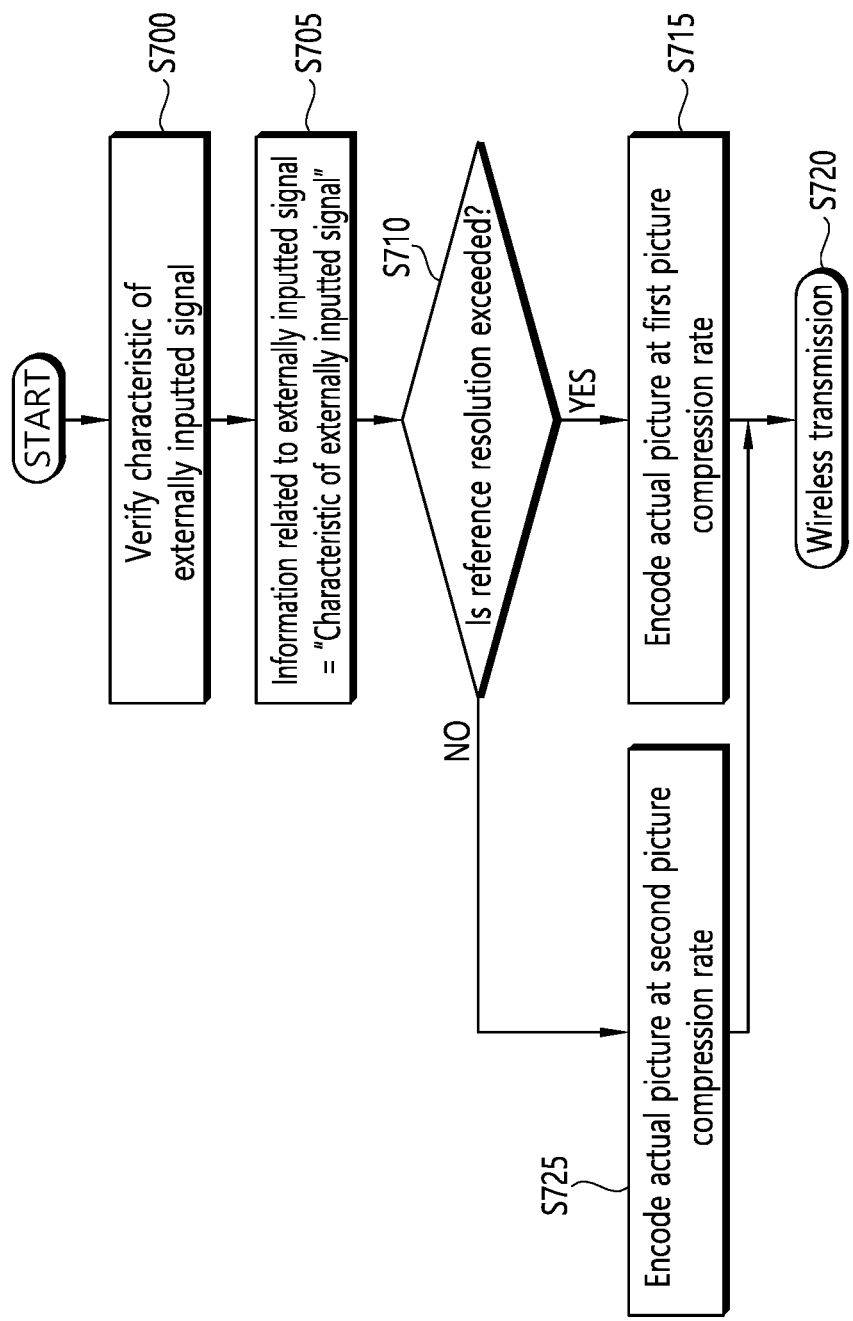
FIG. 7 is a flowchart showing operations of a video transmitting device according to another example.

FIG. 7 is a flowchart showing operations of a video transmitting device according to another example. The present embodiment is based on a premise that an externally inputted signal exists, and, therefore, a picture that is transmitted by the wireless communication unit 514 is an actual picture.

Referring to FIG. 7, the controller 512 verifies (or checks) a characteristic of an externally inputted signal that is inputted from the external device interface unit 511 (S700). For example, the controller 512 may verify whether a resolution and/or format of the externally inputted signal is 480p, 720p, 1080i, 1080p, 2160p (4K), 4320 (8K). Alternatively, the controller 512 may verify whether a resolution and/or format of the externally inputted signal is 60 Hz, 120 Hz.

The controller 512 generates information related to an externally inputted signal indicating the characteristic of the externally inputted signal and transmits the generated information to the picture processor 513.

The image processor 513 receives the information related to an externally inputted signal from the controller 512 and may determine the compression rate of an actual picture based on the characteristic of the externally inputted signal. The characteristic of the actual picture indicates a resolution or a format of the actual picture.

For example, the image processor 513 determines whether the resolution of the actual picture exceeds or is equal to or below a reference resolution. The reference resolution may be, for example, 4K or 8K.

If the resolution of the actual picture exceeds the reference resolution, the picture processor 513 may configure a picture compression rate by selecting one of ½, ⅓ or ¼ (first compression rate) and encodes the actual picture by using the configured first picture compression rate (S715). Thereafter, the wireless communication unit 514 wirelessly transmits the actual picture that is encoded at the first picture compression rate (S720). Conversely, if the resolution of the actual picture is equal to or below the reference resolution, the picture processor 513 configures a picture compression rate as a second picture compression rate (e.g., 0) and, then, encodes the actual picture by using the configured second picture compression rate (S725). Thereafter, the wireless communication unit 514 wirelessly transmits the actual picture that is encoded at the second picture compression rate (S720).

As described above, by having the wireless AV system adaptively vary the picture compression in accordance with the format and resolution of an externally inputted signal and wirelessly transmit the compressed picture, optimal picture signal transmission and wireless transmission quality may be maintained for each resolution of a picture signal.

Referring back to FIG. 5, the information related to an externally inputted signal will be described in detail.

As yet another example, information related to an externally inputted signal may include the presence or absence of an externally inputted signal and the characteristic of an actual picture that is included in the externally inputted signal. And, the picture processor 513 may determine a picture compression rate based on the presence or absence of an externally inputted signal and the characteristic of the actual picture. The characteristic of the actual picture may be, for example, a resolution or a format. In this case, operations of the controller 512 and the picture processor 513 may be performed based on the flowchart of FIG. 8.

Figure 8:
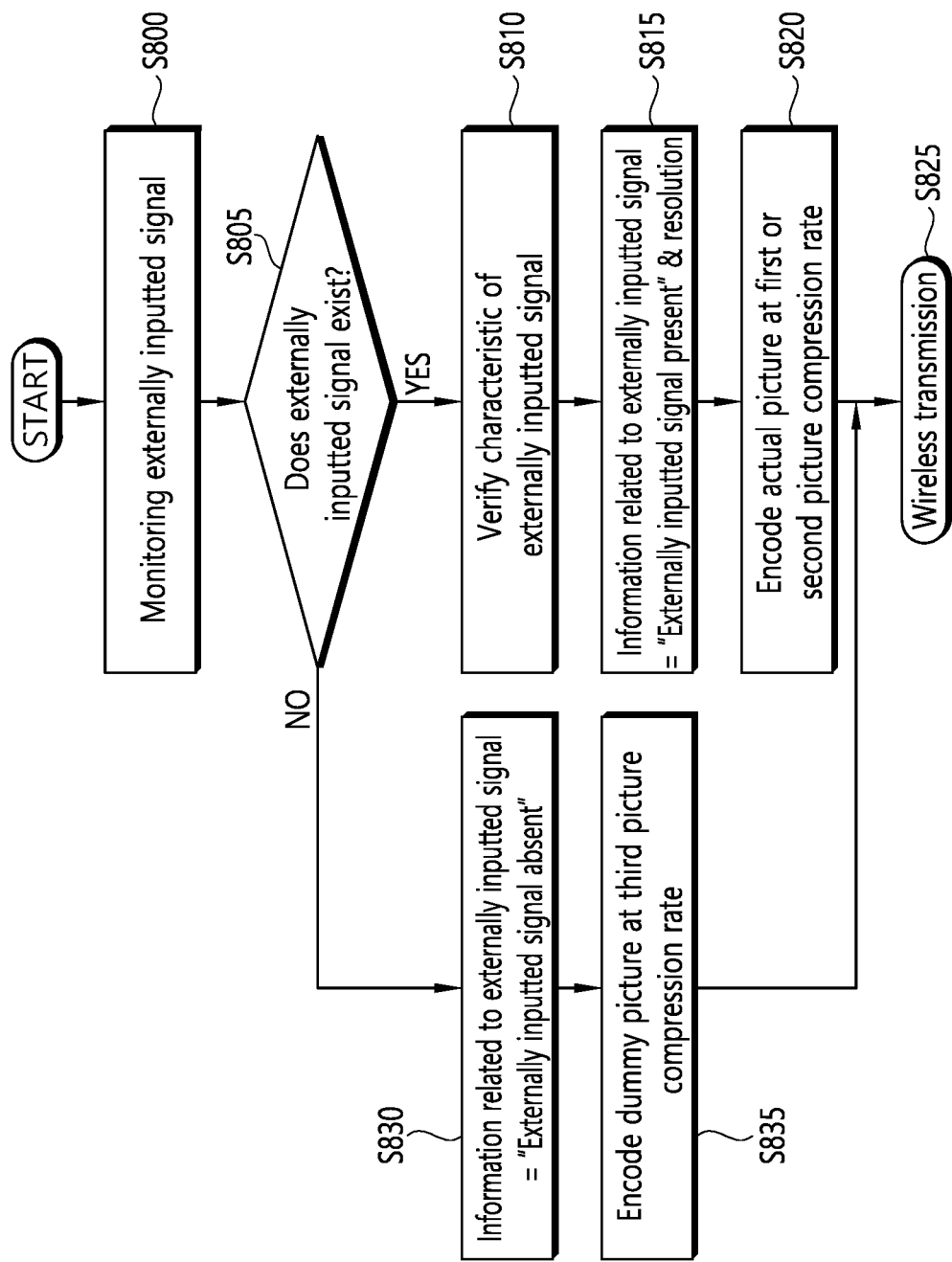
FIG. 8 is a flowchart showing operations of a video transmitting device according to yet another example.

FIG. 8 is a flowchart showing operations of a video transmitting device according to yet another example.

Referring to FIG. 8, a controller 512 monitors an externally inputted signal that is inputted from an external device interface unit 511 (S800). For example, the controller 512 monitors physical contact between the external device interface unit 511 and an external input source and/or an intensity of the externally inputted signal, and, based on the monitoring result, the controller 512 may determine the presence or absence of an externally inputted signal. Therefore, the controller 512 determines whether an externally inputted signal exists (S805).

If the controller 512 detects an externally inputted signal that is inputted from the external device interface unit 511, the controller 512 verifies (or checks) a characteristic of an externally inputted signal (S810). For example, the controller 512 may verify whether a resolution and/or format of the externally inputted signal is 480p, 720p, 1080i, 1080p, 2160p (4K), 4320 (8K). Alternatively, the controller 512 may verify whether a resolution and/or format of the externally inputted signal is 60 Hz, 120 Hz.

The controller 512 generates information related to an externally inputted signal indicating the presence or absence of an externally inputted signal and the characteristic of the externally inputted signal (resolution or format) and transmits the generated information to the picture processor 513.

The picture processor 513 configures a first picture compression rate or second picture compression rate in accordance with whether the resolution of an actual picture exceeds or is equal to or below a reference resolution, and, then, the picture processor 513 encodes the actual picture by using the configured picture compression rate (S820). Herein, the reference resolution may be defined, for example, as 4K or 8K.

If the resolution of the actual picture exceeds the reference resolution, the picture processor 513 may configure a picture compression rate by selecting one of ½, ⅓ or ¼ (first compression rate) and encodes the actual picture by using the configured first picture compression rate. Thereafter, the wireless communication unit 514 wirelessly transmits the actual picture that is encoded at the first picture compression rate (S825).

Conversely, if the resolution of the actual picture is equal to or below the reference resolution, the picture processor 513 configures a picture compression rate as a second picture compression rate (e.g., 0) and, then, encodes the actual picture by using the configured second picture compression rate. Thereafter, the wireless communication unit 514 wirelessly transmits the actual picture that is encoded at the second picture compression rate (S825).

Meanwhile, in step S805, if the controller 512 fails to detect any externally inputted signal that is inputted from the external device interface unit 511, the controller 512 indicates the presence or absence of the externally inputted signal as "externally inputted signal absent" and delivers the information related to the externally inputted signal to the picture processor 513 (S830). The picture processor 513 determines a third picture compression rate based on the information related to the externally inputted signal and encodes a dummy picture by using the third picture compression rate (S835). Thereafter, the wireless communication unit 514 wirelessly transmits the dummy picture that is encoded at the third picture compression rate. The third picture compression rate may be relatively higher than the first or second picture compression rate. For example, the third picture compression rate may have a compression ratio that is equal to or greater than a multiple of 1/6 to 1/10. Alternatively, the third picture compression rate may be a compression rate that is higher than a visually lossless compression rate.

As described above, by having the wireless AV system adaptively vary the picture compression in accordance with the presence or absence of an externally inputted signal and the format and resolution of the externally inputted signal and wirelessly transmit the compressed picture, it will become possible to design a wireless AV system that is advantageous for ensuring RF signal performance through range expansion, interference cancellation, power saving.

Referring back to FIG. 5, the picture receiving device 520 includes a wireless communication unit 521, a picture processor 522, a controller 523, and a frame rate conversion unit (FRC) 524.

The wireless communication unit 521 may perform the same function as the wireless communication unit 210 of FIG. 1. More specifically, the wireless communication unit 521 receives, from the wireless communication unit 514, a picture that is encoded at a variable compression rate based on the presence or absence of an actual picture signal and/or the characteristic (resolution or format) of the actual picture signal. In this case, the wireless communication unit 521 may receive an actual picture that is encoded at the first or second picture compression rate according to FIG. 8, or the wireless communication unit 521 may receive a dummy picture that is encoded at the third picture compression rate according to FIG. 3.

The picture processor 522 receives an encoded actual or dummy picture through the wireless communication unit 521 and, then, the picture processor 522 decodes the encoded picture by using the variable compression rate. The picture processor 522 may be provided as a functional element of the wireless communication unit 521, or may be provided as a functional element of the controller 523.

The controller 523 reconstructs (or restores) the actual or dummy picture that is received from the picture processor 522 and delivers the reconstructed (or recovered) picture to the FRC 524. Thereafter, the FRC 524 may output, for example, an 8K 120p signal to a T-con.

A signal that is provided to the picture processor 522 from the wireless communication unit 521, a signal that is provided to the controller 523 from the picture processor 522, and a signal that is provided to the FRC 524 from the controller 523 may each be referred to as a Vx1 signal.

Since the device and method for receiving wireless data or the device and method for transmitting wireless data according to the above-described embodiments of the present disclosure do not mandatorily require all of the components or operations that are described above, the device and method for receiving wireless data or the device and method for transmitting wireless data may be performed by including all or part of the above-described components or operations. Additionally, the above-described embodiments of the device and method for receiving wireless data or the device and method for transmitting wireless data may be performed in combination with each other. Furthermore, the above-described components or operations are not mandatorily required to be performed in the order that is described above, and, therefore, it is also possible for components or operations (or process steps) that are described in a later order to be performed before the components or operations (or process steps) that are described in an earlier order.

The foregoing description has been presented merely to provide an exemplary description of the technical idea of the present disclosure, and it will be apparent to those skilled in the art to which the present disclosure pertains, that various changes and modifications in the embodiments described herein can be made without departing from the scope and spirit of the present disclosure. Therefore, the embodiments of the present disclosure described above can be implemented separately or in combination with each other.

The embodiments disclosed herein are provided not to limit the technical idea of the present disclosure but to describe the present disclosure, and the scope of the technical idea of the present disclosure should not be limited to these embodiments. The scope of the present disclosure should be interpreted by the following claims, and all technical ideas within the scope of equivalents thereto should be construed as being included in the scope of the present disclosure.

What is claimed is:

1. A device for processing and transmitting a picture in a wireless audio/video, AV, system, the device comprising:
    an external device interface unit being configured to receive an externally inputted signal including an actual picture;
    a controller being connected to the external device interface unit so as to detect the externally inputted signal and being configured to generate information related to the externally inputted signal;
    a picture processor being connected to the controller so as to receive at least one of the externally inputted signal and the information related to the externally inputted signal from the controller, determine a picture compression rate based on the information related to the externally inputted signal, and output a compressed picture based on the determined picture compression rate; and
    a communication unit transmitting the compressed picture through a wireless channel, wherein the information related to the externally inputted signal includes a presence or absence of the externally inputted signal, wherein, when the controller detects the externally inputted signal, the controller configures the information related to the externally inputted signal so as to indicate the presence of the externally inputted signal, the determined picture compression rate is set to a first picture compression rate which is no compression, a visually lossless compression rate, or a compression rate that is lower than a visually lossless compression rate, and
    wherein, when the controller fails to detect the externally inputted signal, the controller configures the information related to the externally inputted signal so as to indicate the absence of the externally inputted signal, the determined picture compression rate is set to a second picture compression rate relatively higher than the first picture compression rate, which has a compression ratio that is equal to or greater than a multiple of 1/6 to 1/10.

2. The device of claim 1,
    wherein the compressed picture is the actual picture that is compressed.

3. The device of claim 1,
    wherein the compressed picture is a dummy picture that is compressed and not the actual picture.

4. The device of claim 1, wherein the information related to the externally inputted signal includes a characteristic of the actual picture, wherein the characteristic is at least one of a resolution or a format, and wherein the picture processor determines the picture compression rate based on the characteristic of the actual picture.

5. The device of claim 4, wherein, when the resolution of the actual picture is equal to or less than a reference resolution, the picture processor configures the picture compression rate to 0, and, when the resolution of the actual picture exceeds the reference resolution, the picture processor configures the picture compression rate to one of ½, ⅓ or ¼, and wherein the compressed picture is the actual picture that is compressed.

6. The device of claim 1, wherein the information related to the externally inputted signal includes a presence or absence of the externally inputted signal and a characteristic of the actual picture.

7. The device of claim 6, wherein, when the controller fails to detect the externally inputted signal, the controller configures the information related to the externally inputted signal so as to indicate the absence of the externally inputted signal, wherein the picture processor determines the picture compression rate to be equal to or greater than a threshold compression rate, and wherein the compressed picture is a dummy picture that is compressed and not the actual picture.

8. The device of claim 6, wherein, when the controller detects the externally inputted signal, the controller configures the information related to the externally inputted signal so as to indicate the presence of the externally inputted signal, and wherein the picture processor determines the picture compression rate based on the characteristic of the actual picture.

9. The device of claim 8, wherein a characteristic of the actual picture includes a resolution of the actual picture, wherein, when the resolution of the actual picture is equal to or less than a reference resolution, the picture processor configures the picture compression rate to 0, and, when the resolution of the actual picture exceeds the reference resolution, the picture processor configures the picture compression rate to one of ½, ⅓ or ¼, and wherein the compressed picture is the actual picture that is compressed.

\* \* \* \* \*